(12) United States Patent
Yoshida et al.

(10) Patent No.: US 10,412,163 B2
(45) Date of Patent: Sep. 10, 2019

(54) COMPUTER SYSTEM, DISTRIBUTED OBJECT SHARING METHOD, AND EDGE NODE

(71) Applicant: Hitachi, Ltd., Tokyo (JP)

(72) Inventors: Misato Yoshida, Tokyo (JP); Masanori Takata, Tokyo (JP); Akiyoshi Tsuchiya, Tokyo (JP); Hitoshi Kamei, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 289 days.

(21) Appl. No.: 15/540,045

(22) PCT Filed: Jan. 30, 2015

(86) PCT No.: PCT/JP2015/052622
§ 371 (c)(1),
(2) Date: Jun. 27, 2017

(87) PCT Pub. No.: WO2016/121083
PCT Pub. Date: Aug. 4, 2016

(65) Prior Publication Data
US 2018/0109611 A1     Apr. 19, 2018

(51) Int. Cl.
*H04L 29/08* (2006.01)
*G06F 16/176* (2019.01)
(Continued)

(52) U.S. Cl.
CPC .......... *H04L 67/1095* (2013.01); *G06F 11/00* (2013.01); *G06F 16/176* (2019.01); *G06F 16/1827* (2019.01); *H04L 67/1097* (2013.01)

(58) Field of Classification Search
None
See application file for complete search history.

(56) References Cited

U.S. PATENT DOCUMENTS 7,778,963 B2 * 8/2010 Novik ................. G06F 16/1844
707/610
2007/0282914 A1   12/2007 Sivapragasam et al.
(Continued)

FOREIGN PATENT DOCUMENTS

| JP | 2013-529810 A | 7/2013 |
| WO | 2014/128819 A1 | 8/2014 |
| WO | 2014/154578 A1 | 10/2014 |

OTHER PUBLICATIONS

Libes, Don. "Managing Tcl's Namespaces Collaboratively." Proceedings of the Fifth Annual Tcl/Tk Workshop. Boston MA. 10 pages. (Year: 1997).*

(Continued)

*Primary Examiner* — Jeffrey R Swearingen
(74) *Attorney, Agent, or Firm* — Mattingly & Malur, PC

(57) ABSTRACT

(A) and (B), described hereinafter, are carried out for objects which differ between an reflection source namespace and a reflection destination namespace, with respect to either: a center node in a migration, which applies an update of a first local namespace which a first edge node (any edge node) provides to a center namespace; or a second edge node (any edge node other than the first edge node) in a synchronization, which applies an update of the center namespace to a second local namespace which the second edge node provides. Specifically, either the center node or the second edge node: (A) determines whether the situation with respect to the differing objects corresponds to a conflict case among defined conflict cases; and (B) if the result of the determination in (A) is affirmative, executes a process according to a confliction resolution policy which is associated with the corresponding conflict case.

13 Claims, 13 Drawing Sheets

(51) Int. Cl.
*G06F 16/182* (2019.01)
*G06F 11/00* (2006.01)

(56) References Cited

U.S. PATENT DOCUMENTS

2011/0320407 A1  12/2011  Augustine et al.
2015/0358408 A1  12/2015  Fukatani et al.
2016/0321338 A1* 11/2016  Isherwood .......... H04L 67/1095

OTHER PUBLICATIONS

Marc Eshel, et al., "Panache: A Parallel File System Cache for Global File Access", IBM Almaden Research, FAST' 10, 2010.
International Search Report of PCT/JP2015/052622 dated Mar. 10, 2015.

* cited by examiner

FIG. 4

| | Policy name | Conflict case | Confliction resolution policy |
|---|---|---|---|
| 404 | Both-Win | Case where different paths in same directory between [other location] and [own location] has been created, removed or renamed | Merge operations in [other location] and [own location] |
| 405 | Directory-Win | Case where a file having same name as directory created or renamed in [other location] has been created in [own location] | Hold directory created in [other location] and move file created in [own location] to directory for evacuation |
| 406 | First-Mig-Win | Case where file path having same name as file path created, updated, removed or renamed in [other location] has been created, updated, removed or renamed in [own location] | Apply state on CAS (operation in [other location]) to file system in own location. Move file created or updated in [own location] to directory for evacuation |
| 407 | Tree-Delete-Win | Case where file path that is child of directory removed in [other location] on directory tier has been updated in [own location] | Apply operation in [other location]. At this time, remove file updated in [own location] (without movement to directory for evacuation) |

Columns: 401, 402, 403; Table 400

FIG. 7
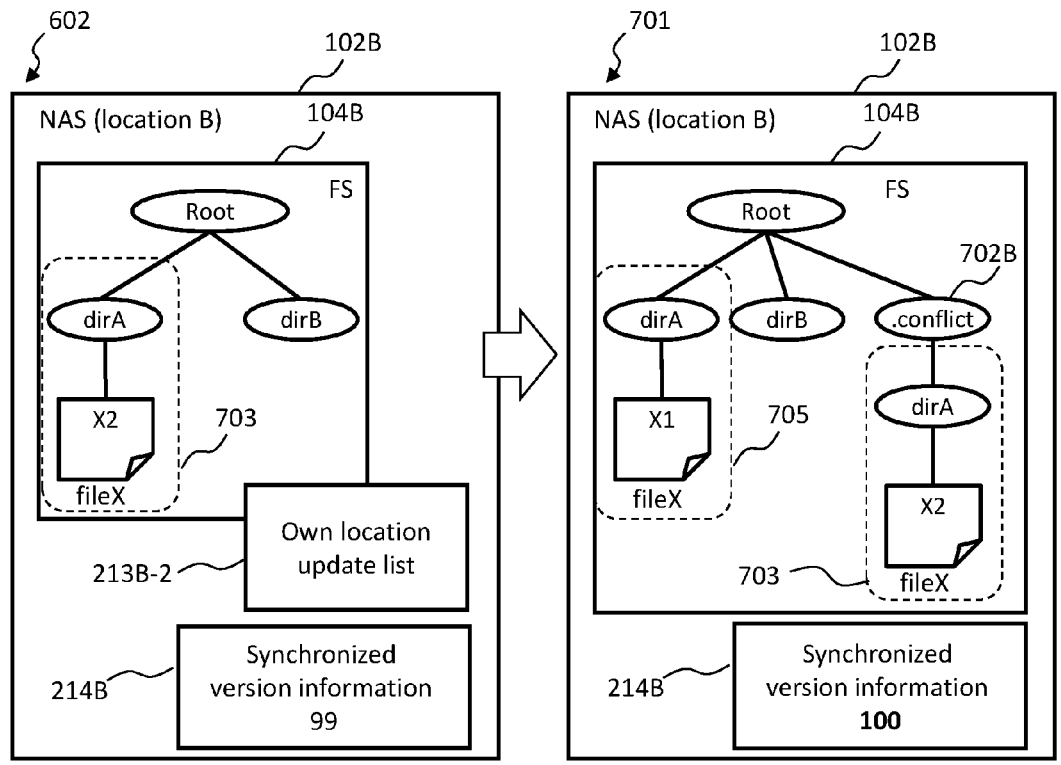
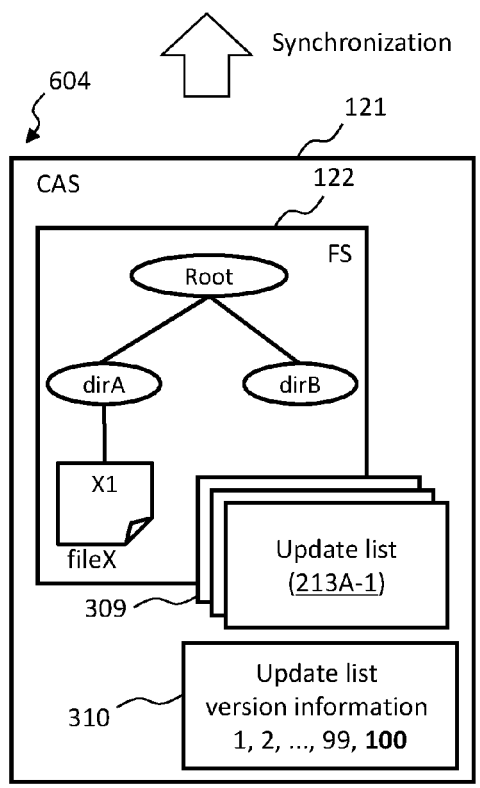

FIG. 12

Policy information definition screen

| Add | Correct existing policy | Remove |

List of existing policies

| Policy name | Conflict case | Confliction resolution policy |
|---|---|---|
| Both-Win | Case where different paths in same directory between [other location] and [own location] has been created, removed or renamed | Merge operations in [other location] and [own location] |
| Directory-Win | Case where file having same name as directory created or renamed in [other location] has been created in [own location] | Hold directory created in [other location] and move file created in [own location] to directory for evacuation |
| First-Mig-Win | Case where file path having same name as file path created, updated, removed or renamed in [other location] has been created, updated, removed or renamed in [own location] | Apply state on CAS (operation in [other location]) to file system in own location. Move file created or updated in [own location] to directory for evacuation |
| Tree-Delete-Win | Case where file path that is a child of directory removed in [other location] on directory tier has been updated in [own location] | Apply operation in [other location]. At this time, remove file updated in [own location] (without movement to directory for evacuation) |

COMPUTER SYSTEM, DISTRIBUTED OBJECT SHARING METHOD, AND EDGE NODE

TECHNICAL FIELD

The present invention generally relates to distributed object sharing.

BACKGROUND ART

A computer system has been known where edge servers are placed at respective locations, and a core server that can communicate with each edge server is placed at a data center apart from the locations (e.g., PTL 1). At each location, the edge node provides a client with a namespace (hereinafter a local namespace), such as a file system, and the client updates the local namespace (e.g., a change operation (e.g., creation, update, deletion, renaming, or copy) is applied to the objects (directories and files) in the local namespace). Update of the local namespace provided by any of the edge nodes is applied to the namespace (hereinafter a center namespace) managed by the core node (migration). The update of the center namespace managed by the core node is applied to the local namespace provided by another edge node (synchronization). The edge nodes thus share the namespace.

Different change operations to an identical object in different local namespaces can cause confliction of objects. PTL 1 resolves confliction by moving the conflict file to a special directory for evacuation. NPL 1 resolves confliction by any of a method of moving the conflict file to a special directory for evacuation and a method of overwriting, on the conflict file, a file subjected to another change operation.

CITATION LIST

Patent Literature

[PTL 1] WO2014/174578

Non-Patent Literature

[NPL 1] IBM, "Panache: A Parallel File System Cache for Global File Access", FAST'10, 2010.

SUMMARY OF INVENTION

Technical Problem

Unfortunately, simple adoption of the overwriting method (hereinafter a first method) loses the content of the previously updated object. Simple adoption of the method of moving the conflict file to the special directory for evacuation (hereinafter a second method) allows many objects to exist under the special directory for evacuation, which may complicate the management.

Solution to Problem

A center node or a second edge node carries out (A) and (B), described hereinafter, for objects which differ between an reflection source namespace and an reflection destination namespace, with respect to either: a center node in migration, which applies an update of a first local namespace which a first edge node (any edge node) provides to a center namespace; or a second edge node (any edge node other than the first edge node) in a synchronization, which applies an update of the center namespace to a second local namespace which the second edge node provides. Specifically, either the center node or the second edge node: (A) determines whether the situation with respect to the differing objects corresponds to a conflict case among a plurality of defined conflict cases; and (B) if the result of the determination in (A) is affirmative, executes a process according to a confliction resolution policy which is associated with the corresponding conflict case.

Advantageous Effects of Invention

At least one of usability and flexibility is higher than that in a case of always performing only one of the first and second methods.

BRIEF DESCRIPTION OF DRAWINGS

FIG. 4 shows an example of policy information.
FIG. 7 shows an example of situations before and after a synchronization process from the CAS to the NAS in a location B.
FIG. 12 shows an example of a first UI.

DESCRIPTION OF EMBODIMENTS

Figure 1:
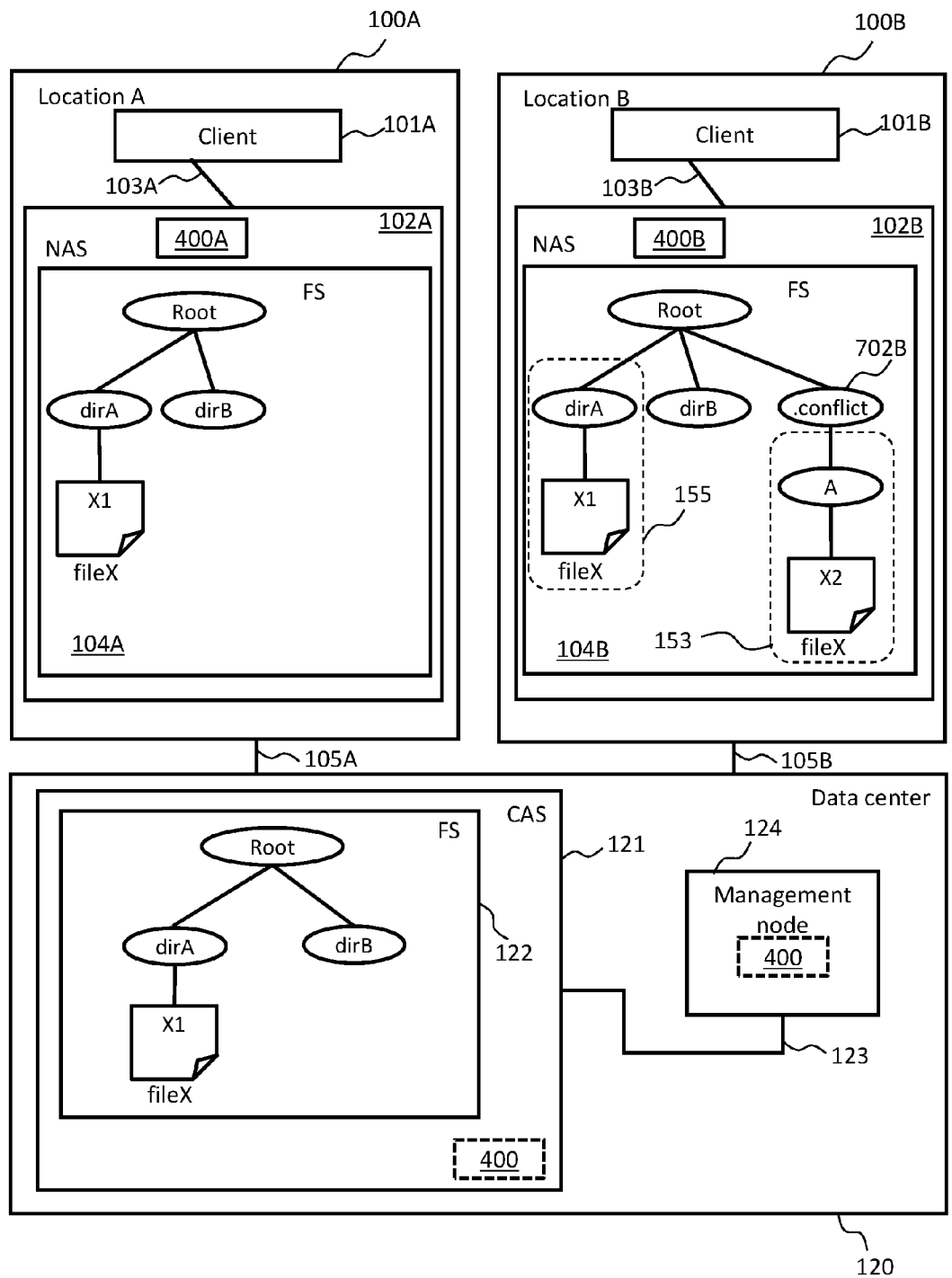
FIG. 1 shows an overview of a computer system according to an Embodiment.

An Embodiment is hereinafter described.

In the following description, information is sometimes described in the representation of "xxx list". The information may, however, be represented in any data structure instead. That is, to indicate that information may be represented independently of the data structure, xxx list" may be called "xxx information".

In the following description, an ID or a name is used as identification information on an element. Alternatively or additionally, another type of identification information may be used.

In the following description, in a case of description without discrimination between the same type of elements, a common number in a reference number or reference sign is used. In a case of description with discrimination between the same type of elements, the reference sign of the element is used or an ID allocated to the element is used instead of the reference sign in some cases.

In the following description, a "storing unit" may be one or more memory devices including a memory. For example, the storing unit may be at least a main storing device (typically, a volatile memory) between the main storing device and an auxiliary storing device (typically, a nonvolatile memory device). The storing unit may include at least one of a cache area (e.g., a cache memory or its partial area) and a buffer area (e.g., a buffer memory or its partial area).

In the following description, "PDEV" indicates a physical storing device, and may be typically a nonvolatile storing device (e.g., an auxiliary storage device). The PDEV may be, for example, an HDD (Hard Disk Drive) or SSD (Solid State Drive).

In the following description, "RAID" is an abbreviation of Redundant Array of Independent (or Inexpensive) Disks. A RAID group is made up of multiple PDEVs, and stores data according to the RAID level associated with this RAID group. The RAID group may be called a parity group. The parity group may be, for example, a RAID group that stores parities.

In the following description, a process is sometimes described with a "program" being adopted as the subject of a sentence. The program is executed by a processor (e.g., a CPU (Central Processing Unit)), thereby performing a predetermined process appropriately using a storing unit (e.g., a memory) and/or an interface device (e.g., a communication port). Consequently, the subject of a sentence concerning the process may be the processor. The process described with a program being adopted as the subject of a sentence may be a process to be executed by the processor, an apparatus including the processor, or a system. The processor may include a hardware circuit that performs a part of or the entire process. The program may be installed from a program source to an apparatus, such as a computer. The program source may be, for example, a program distribution server or a storing medium (e.g., a portable storing media) readable by a computer. In a case where the program source is a program distribution server, the program distribution server includes a processor (e.g., a CPU) and a storing unit. The storing unit may further store a distribution program, and a distribution target program. The processor of the program distribution server may execute the distribution program to allow the processor of the program distribution server to distribute the distribution target program to another computer. In the following description, two or more programs may be realized as a single program. Alternatively, a single program may be realized as two or more programs.

In the following description, a management node may include one or more computers. More specifically, for example, in a case where a management computer displays information (more specifically, for example, the management computer displays information on its own display device, or the management computer transmits display information to a remote display computer), the management computer serves as a management node. For example, in a case where multiple computers realize a function analogous to that of the management computer, these computers (in a case where display is made by a display computer, the display computer may be included) serve as the management node. The management computer may include an interface device coupled to an I/O system that includes a display system, a storing unit (e.g., a memory), and a processor coupled to the interface device and the storing unit. The display system may be a display device included in the management computer, or a display computer coupled to the management computer. The I/O system may be I/O devices (e.g., a keyboard and a pointing device and a touch panel) included in the management computer, or a display computer coupled to the management computer, or another computer. The management computer's "displaying the display information" means displaying the display information on the display system. This may mean displaying the display information on the display device included in the management computer, or the management computer's transmitting the display information to the display computer (in the latter case, the display information is displayed by the display computer). The management computer's input and output of information may mean input and output from and to the I/O device included in the management computer, or input and output from and to a remote computer (e.g., the display computer) coupled to the management computer. Output of information may be display of information.

In the following Embodiment, NAS (Network Attached Storage) is adopted as an example of an edge node, and CAS (Content Addressed Storage) is adopted as a core node.

In the following Embodiment, the computer system including the CAS and multiple NASs adopt a confliction resolution policy that gives priority to a center namespace (i.e., a previously updated local namespace) over an application target namespace. The priority may, however, be given to any namespace. For example, the priority order of the local namespace of a certain NAS may be higher than the priority order of the center namespace, while the priority order of the local namespace of another NAS may be lower than the priority order of the center namespace. The confliction resolution policy may be provided for any of the NASs, the CAS, and a management node coupled to at least one of the CAS and NASs.

In the following Embodiment, reflection from the NAS to the CAS (reflection of the local namespace update to the center namespace) is called "migration", and reflection from the CAS to NAS (reflection of the center namespace update to the local namespace) is called "synchronization".

In the following Embodiment, the computer system may include multiple clients and a single NAS instead of the multiple NASs and a single CAS. That is, an example of the edge node may be a client, and an example of the core node may be an NAS.

When an object common to multiple NASs (or multiple clients) is referred to, locking is required for the CAS (or NAS) having the common object with respect to at least this common object. A known method may be used as the locking process. Accordingly, in the description of the following Embodiment, the description of the locking process is omitted.

In the following Embodiment, a "file system" is adopted as an example of the namespace. The file system is sometimes called "FS".

In the following description, objects closer to the root node than a certain object is sometimes called "higher objects". In particular, among such objects, an object immediately close to the certain object is sometimes called a "parent object". On the other hand, objects more distant from the root node than a certain object is sometimes called "lower objects". In particular, among such objects, an object immediately close to the certain object is sometimes called a "child object". The object may be, for example, a directory or a file.

FIG. 1 shows an overview of a computer system according to the Embodiment.

There are multiple locations 100 for a single data center 120. In this Embodiment, it is assumed that two locations, or a location A (100A) and a location B (100B), reside as the multiple locations 100. Alternatively, the number of locations 100 may be more than two. In the following description, the elements in the location A are sometimes described with "A" being attached to the ends of the respective reference signs, while the elements in the location B are sometimes described with "B" being attached to the ends of the respective reference signs. When the elements in the location A and the elements in the location B are not specifically discriminated from each other, any of "A" and "B" is not attached to the end of the reference signs in some cases. In some cases, one of the locations A and B is exemplified and described and description of the other location is omitted. This omission is for preventing the description from being redundant (overlapped). The locations A and B have the same functions.

The location A (100A) includes a client 101A, and an NAS 102A that provides the client 101A with a local FS 104A via a communication network 103A (e.g., LAN (Local Area Network)). Likewise, the location B (100B) includes a client 101B, and an NAS 102B that provides the client 101B with a local FS 104B via a communication network 103B (e.g., LAN). Each of the numbers of clients 101A and clients 101B may be more than one. The client 101 is a computer that uses a file sharing service provided by the NAS 102. The client 101 uses the file sharing service provided by the NAS 102 using a file sharing protocol, such as NFS (Network File System) or CIFS (Common Internet File System), via the network 103.

The data center 120 includes a CAS 121 that provides a center FS 122. The NASs 102A and 102B are coupled to the CAS 121 via communication networks 105A and 105B (e.g., WANs (Wide Area Networks)). The communication networks 105A and 105B may be consolidated, or communication networks separated from each other. A management node 124 is coupled to the CAS 121 via a communication network 123 (e.g., LAN). A manager (an operator of the management node 124) manages the CAS 121 (and NAS 102) through the management node 124.

Management encompasses, for example, starting the operation of CAS 121 (and NAS 102), stopping the CAS 121 (and NAS 102), managing the account of the client 101. The management node 124 may be communicably coupled to at least one NAS. Alternatively, at least one NAS management node may be provided besides the management node 124.

Data read and written by the client 101A is stored as a file in the local FS 104A. Likewise, data read and written by the client 101B is stored as a file in the local FS 104B. The local FSs 104A and 104B and the center FS 122 have the same namespace.

The NAS 102 transmits, to the data center 120, a file stored in the local FS 104 at a certain opportunity (predetermined or freely selected timing). The transmitted file is stored in the center FS 122 (migration). The NAS 102 applies the update of the center FS 122 to the local FS 104 at a certain opportunity (predetermined or freely selected timing) (synchronization).

In the different local FSs 104A and 104B, reflection of different change operations (e.g., creation, update, deletion or renaming) to the same object (e.g., a directory, file, or file path) can cause a confliction.

In this Embodiment, each NAS 102 holds policy information 400. The policy information 400 contains multiple confliction resolution policies associated with defined conflict cases. In synchronization, each NAS 102 refers to the policy information 400, and determines whether the object different between the center FS 122 (reflection source) and the local FS 104 (reflection target) applies to any conflict case among defined conflict cases or not. When the determination result is affirmative, the NAS 102 executes, for the different object, a process according to the confliction resolution policy associated with the corresponding conflict case.

An example of the corresponding conflict case and the process according to the confliction resolution policy associated with this conflict case is as shown in FIG. 1.

It is assumed that in response to a write request issued from the client 101A, the NAS 102A updates the local FS 104A. It is assumed that the update is for a file X that is a child object of a directory A in the local FS 104A. The update of the file X here is updating the content of the file X or the file name. The file X updated by the NAS 102A is called "file X1". It is, on the other hand, assumed that before the local FS 104A is updated or the update is applied, the NAS 102B updates the local FS 104B in response to the write request issued by the client 101B. It is assumed that the update is for the identical file according to the identical file path, that is, the file X, which is a child object of the directory A. It is further assumed that the update is for the content of the file X or the file name but is update different from the update in the NAS 102A. The file X updated by the NAS 102B is called "file X2". The files X1 and X2 conflict with each other.

It is assumed that, first, the NAS 102A communicates with the CAS 121. It is assumed that this communication allows the NAS 102A to identify that the file X1 does not conflict with any file in the center FS 122. It is further assumed that migration is performed between the NAS 102A and the CAS 121. That is, it is assumed that the update of the local FS 104A is applied to the center FS 122. Consequently, in the center FS 122, the file X in the directory A is updated to the file X1.

It is assumed that, subsequently, the NAS 102B communicates with the CAS 121. It is assumed that this communication allows the NAS 102B to identify that the file X2 conflict with the file X1 in the center FS 122. The NAS 102B identifies the confliction resolution policy associated with the conflict case on the basis of the policy information 400, and performs a process according to the identified confliction resolution policy. In the example of FIG. 1, the process is as follows. That is, the NAS 102B creates a directory for evacuation (not shown) under the special directory 702B (".conflict") in the local FS 104B. The special directory 702B is a predetermined directory that serves as the creation destination of the directory for evacuation. As indicated by reference sign 153, the NAS 102B evacuates a file path that is a path in the local FS 104B and is to the conflicting file X2 (a group of the conflicting file X2 and higher objects existing between the conflicting file X2 and the root node), to an evacuation directory created under the special directory 702B. As indicated by reference sign 155, the NAS 102B applies a file path that is a path in the center FS 122 and is to the file X1 (a group of the file X1 and higher objects existing between the file X1 and the root node), to the local FS 104B. The group evacuated to the evacuation directory and the group to be applied to the local FS 104 may be only the conflicting file and its parent object.

As described above, the confliction resolution policy associated with the corresponding conflict case is executed. In this Embodiment, each NAS 102 holds the policy information 400, while as indicated by dotted lines the policy information 400 may be held by at least one of the CAS 121 and the management node 124 coupled to at least one of the CAS 121 and NAS 102 instead of or besides the NAS 102. In a case where a node other than the NAS 102 holds the policy information 400, communication such as notification (or query) between the NAS 102 and the node can be required. If each NAS 102 holds the policy information 400 as with this Embodiment, such communication is not required. In particular, the edge node, such as the NAS 102, is a node that accepts a change operation to a file (e.g., a creation, update or renaming request) at the first time. The significance of such a node's holding the policy information 400 (and the significance of executing the process according to the confliction resolution policy) is higher than that of another type of node's holding the policy information 400. The conflict case may be identified by any of the CAS 121 and the management node 124, instead of the NAS 102. The process according to the confliction resolution policy is performed by the NAS 102. Alternatively, the process may be performed according to an instruction from the CAS 121 having identified the confliction resolution policy or the management node 124. For example, the directory for evacuation may be created in the center FS 122, and the conflicting file may be evacuated to the directory for evacuation.

In this Embodiment, multiple conflict cases and confliction resolution policies associated with the respective conflict cases are defined, and the process according to the confliction resolution policy associated with the corresponding conflict case is executed. Accordingly, in comparison with the case of always performing only one of the overwriting method and the method of evacuating the conflicting file to the directory for evacuation, at least one of the usability and flexibility is high. More specifically, for example, it can be expected that the namespace having a structure intended by a user can be held.

The Embodiment is hereinafter described in detail.

Figure 2:
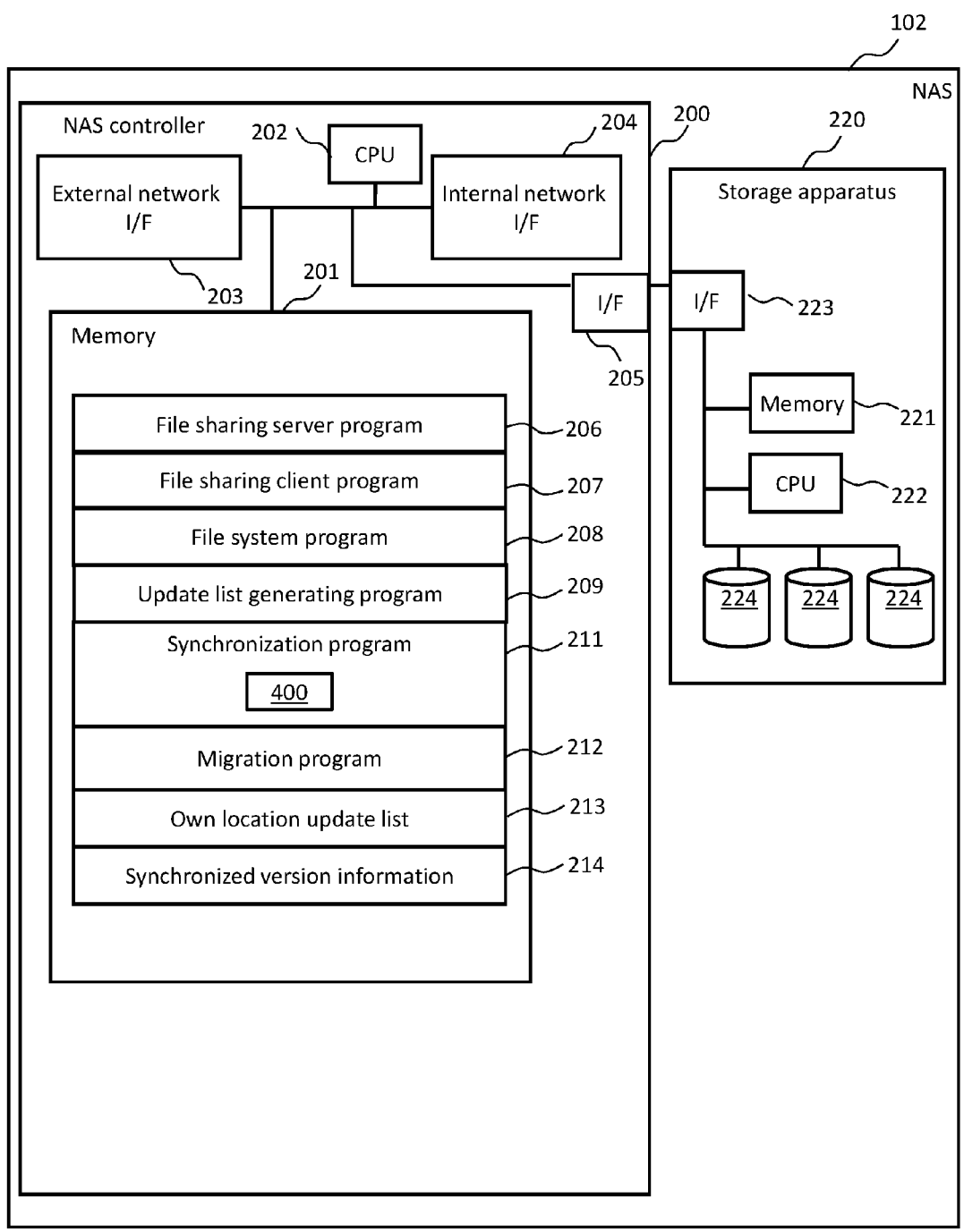
FIG. 2 shows a configuration of an NAS.

FIG. 2 shows the configuration of the NAS 102. In the following description, an interface device is abbreviated as "I/F".

The NAS 102 includes a storage apparatus 220, and an NAS controller 200 coupled to the storage apparatus 220.

The storage apparatus 220 includes an I/F 223 coupled to the NAS controller 200, a memory 221, multiple PDEVs 224, and a CPU 222 coupled thereto. The PDEVs 224 may be one or more RAID groups. The CPU 222 may provide the NAS controller 200 with one or more logical volumes. A storing space based on at least the part of the one or more logical volumes may be provided as the local FS 104 by the NAS controller 200 for the client 101. Data on the file stored in the local FS 104 is stored in one or more PDEVs 224.

The NAS controller 200 may be what is called an NAS head. The NAS controller 200 includes a memory (an example of the storing unit) 201 that stores a program and information, an external network I/F 203 coupled to the client 101 via the network 103, an internal network I/F 204 coupled to the CAS 121 via the network 105, an I/F 205 coupled to the storage apparatus 220, and a CPU (an example of the processor) 202 coupled thereto. The I/Fs 203 to 205 are examples of I/Fs. Two or more of I/Fs 203 to 205 may be the same IF. The CPU 202 executes the program in the memory 201.

The memory 201 stores a file sharing server program 206, a file sharing client program 207, an FS program 208, an update list generating program 209, a synchronization program 211, a migration program 212, an own location update list 213, and synchronized version information 214. At least some of these programs and information stored in the memory 201 may be read by the CPU 202 from the storage apparatus 220 to the memory 201.

The file sharing server program 206 is a program that accepts, from the client 101, an operation on an object (e.g., a file or directory) in the local FS 104. The file sharing client program 207 is a program that performs an operation on a file to be stored in the center FS 122. The FS program 208 is a program that provides the local FS 104. The update list generating program 209 is a program that generates the own location update list 213. The synchronization program 211 is a program that performs synchronization from the center FS 122 to the local FS 104. The policy information 400 described above is held by the synchronization program 211, for example. The policy information 400 may be accessibly held by another program besides the synchronization program 211. The migration program 212 is a program that performs migration from the local FS 104 to the center FS 122.

Figure 8:
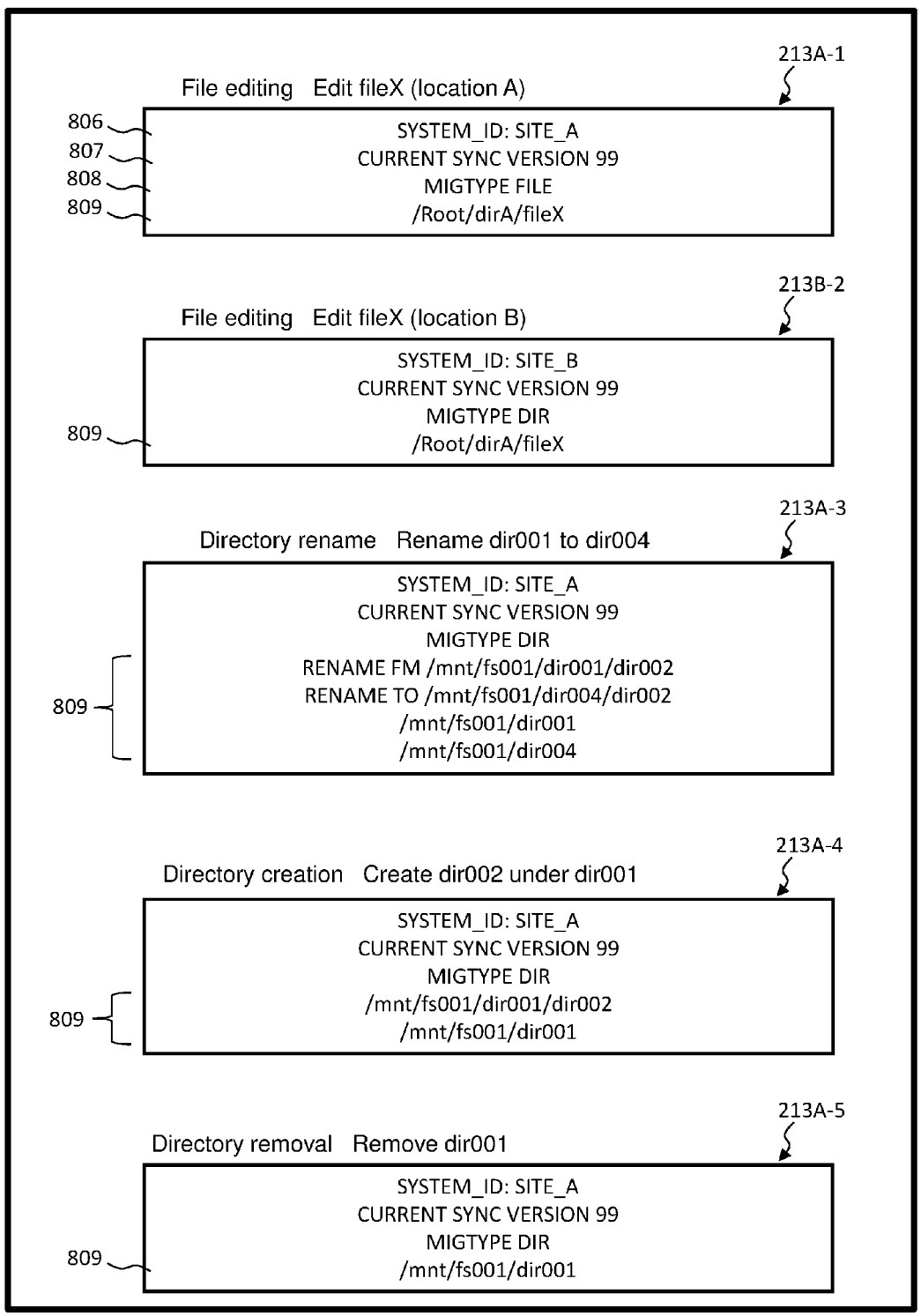
FIG. 8 shows an example of an own location update list.

The own location update list 213 is a list of pieces of information pertaining to the update of the local FS 104. The update of the local FS 104 may be detected by a function of monitoring of an OS (Operating System), not shown. Upon receipt of notification of detecting the update of the local FS 104, the update list generating program 209 may generate the own location update list 213. An example of the own location update list 213 is shown in FIG. 8. The own location update list 213 contains: a SYSTEM_ID 806 that is the ID of a location where the local FS 104 has been updated; a CURRENT SYNC VERSION 807 that is information indicating the latest version of synchronization from the CAS 121; a MIGTYPE 808 that is information indicating the object type (e.g., a file or directory) updated by the client 101; and update content 809 that is information indicating the update details. Reference sign 213A-1 denotes an example of the own location update list in a case where the file X in the location A is edited (a case where the content of the file X is updated). The update content 809 in this list 231A-1 indicates the file path name of the edited file. Reference sign 213B-2 denotes an example of the own location update list in a case where the file X in the location B is edited. Reference sign 213A-3 denotes an example of the own location update list in a case where a directory "dir001" in the location A is renamed to "dir004". The update content 809 in the list 213A-3 indicates the names of a rename source and a rename destination, and the name of the parent directory thereof. Reference sign 213A-4 denotes an example of the own location update list in a case where a child directory "dir002" is created in the directory "dir001" in the location A. The update content 809 in the list 213A-4 indicates the created directory and its parent directory. Reference sign 213A-5 denotes an example of the own location update list in a case where the directory "dir001" in the location A is removed. The update content 809 in the list 213A-5 indicates the removed directory. Such an own location update list 213 is transmitted to the CAS 121. The update according to the own location update list 213 is applied via the CAS 121 to the local FS 104 of another NAS 102, thereby allowing the FSs in the locations to be synchronized with each other.

The synchronized version information 214 contains information representing the latest version of the own location update list 213 applied to the NAS 102 in the own location in the group of own location update lists 213 (one or more own location update lists 213) held in the CAS 121. Thus, in the next synchronization, a list not having been applied to the own location yet can be selected in the group of the own location update lists 213 in the CAS 121, and applied.

Figure 3:
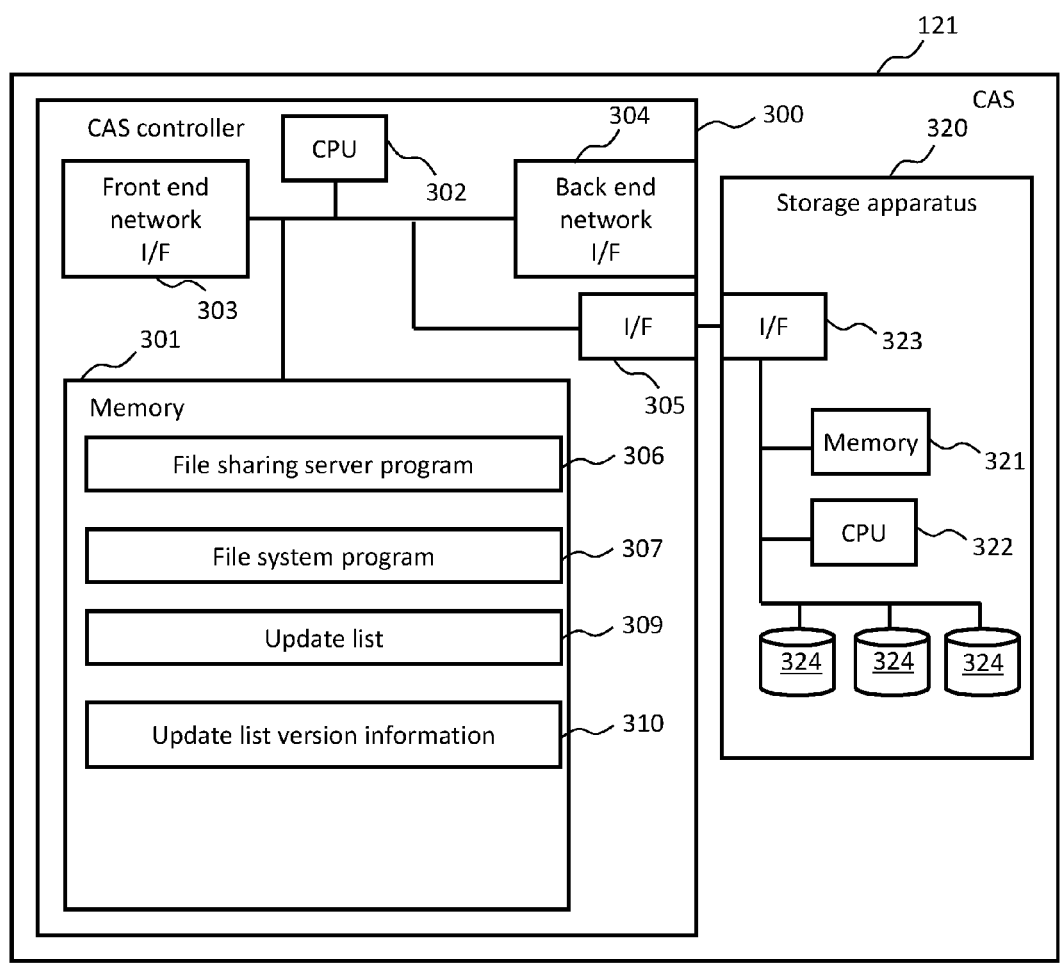
FIG. 3 shows a configuration of a CAS.

FIG. 3 shows the configuration of the CAS 121.

The CAS 121 includes a storage apparatus 320, and a CAS controller 300 coupled to the storage apparatus 320.

The configuration of the storage apparatus 320 may be the same as the configuration of the storage apparatus 220. That is, the storage apparatus 320 also includes an I/F 323 coupled to the CAS controller 300, a memory 321, multiple PDEVs 324, and a CPU 322 coupled thereto.

The CAS controller 300 includes a memory (an example of the storing unit) 301 that stores a program and information, a front end network I/F 303 coupled to the NAS 102 via the network 105, a back end network I/F 304 coupled to the management node 124 via the network 123, an I/F 305 coupled to the storage apparatus 320, and a CPU (an example of the processor) 302 coupled thereto. The I/Fs 303 to 305 are examples of I/Fs. Two or more of I/Fs 303 to 305 may be the same IF. The CPU 322 executes the program in the memory 301.

The memory 301 stores a file sharing server program 306, an FS program 307, an update list 309, and update list version information 310. At least some of these programs and information stored in the memory 301 may be read by the CPU 302 from the storage apparatus 320 to the memory 301.

The file sharing server program 306 is a program that accepts, from each NAS 102, an operation on an object (e.g., a file or directory) in the center FS 122. The FS program 307 provides the center FS 122.

The update list 309 is an own location update list received from each NAS 102 at the time of migration or the like. The update list version information 310 is information containing the version (e.g., the ID (numeric) of the version) of each update list 309 received from each NAS 102.

FIG. 4 shows an example of policy information 400.

The policy information 400 is held by each of the NASs 102. All the pieces of policy information 400 may be the same among the NASs 102. Alternatively, the information may be different in at least one NAS 102. The policy information 400 contains one or more entries. Information held in each entry contains a policy name 401, a conflict case 402, and a confliction resolution policy 403. The policy name 401 indicates the name of a policy. The conflict case 402 indicates a defined conflict case. The confliction resolution policy 403 indicates the content of a process defined in order to resolve the corresponding conflict case.

According to a first entry 404, the updates in both the own location and another location are merged. More specifically, in a case where different paths under the same directory in the other location and the own location are created, removed or renamed, operations in the own location and the other location are merged. This is because, according to the conflict case 402 in the first entry 404, substantially no confliction occurs.

According to a second entry 405, priority is given to the directory over the file. More specifically, in a case where a file having the same name as a directory created or renamed in another location has been created in the own location, the directory created in the other location is held in the own location, and the file created in the own location is moved to the directory for evacuation.

According to a third entry 406, priority is given to the earliest migration. More specifically, in a case where a file path having the same name as a file path created, updated, removed or renamed in another location has been created, updated, removed or renamed in the own location, the state on the CAS 121 (the operation in the other location) is applied to the own location. The file path created, updated or renamed in the own location is moved to the directory for evacuation.

According to a fourth entry 407, priority is given to object removing in the other location. More specifically, in a case where a file path to any object lower than a directory removed in another location has been updated in the own location, the operation in the other location is applied. At this time, the file updated in the own location is removed, and is not moved to the directory for evacuation.

A target node that is at least one among the multiple NASs 102, the CAS 121 and the management node 124 can update such policy information 400. More specifically, a policy update program (not shown) (or a policy update function included in any of the programs) stored in a memory in a target node and executed by a CPU in the target node can perform at least one of entry creation, update and removal. A policy update program may automatically update the policy information 400 in response to change in the configuration of the computer system (e.g., addition of an NAS 102 (location 100), decrease in the number of NASs 102 due to a failure in the NAS 102 or the like). The target node (policy update program) may provide a user interface (hereinafter UI) that accepts an information input from a user or a manager, update at least some of the entries according to the information input through the UI, and add or remove the entry. The UI (e.g., a GUI (Graphical User Interface)) is displayed on a display system of the client 101 (e.g., a display device) or a display system of the management node 124 (e.g., the display device or display computer), for example.

FIG. 12 shows an example of a first UI.

A first UI is a UI for manually creating (adding), updating or removing the entry. The user or manager can define at least one of the policy name, conflict case, and confliction resolution policy in the computer system through the first UI. According to the information input through the first UI, the target node adds the entry to the policy information 400, removes the entry from the policy information 400, and updates at least some entries in the policy information 400 (in the state of the example shown in the diagram, existing policy correction is selected and the second entry is selected as a correction target). Such a UI allows the user or manager to create, update or remove at least one of the policy name, the conflict case, and the confliction resolution policy on the basis of the conflict case, the priority order, and the criterion thereof (e.g., which one of the location 100 and the data center 120 the priority is given to, which location 100 the precedence is given to, and which one of the directory and the file the priority is given to). That is, the collision resolution policy that is most desirable for the user or manager can be easily defined for each collision case.

Figure 13:
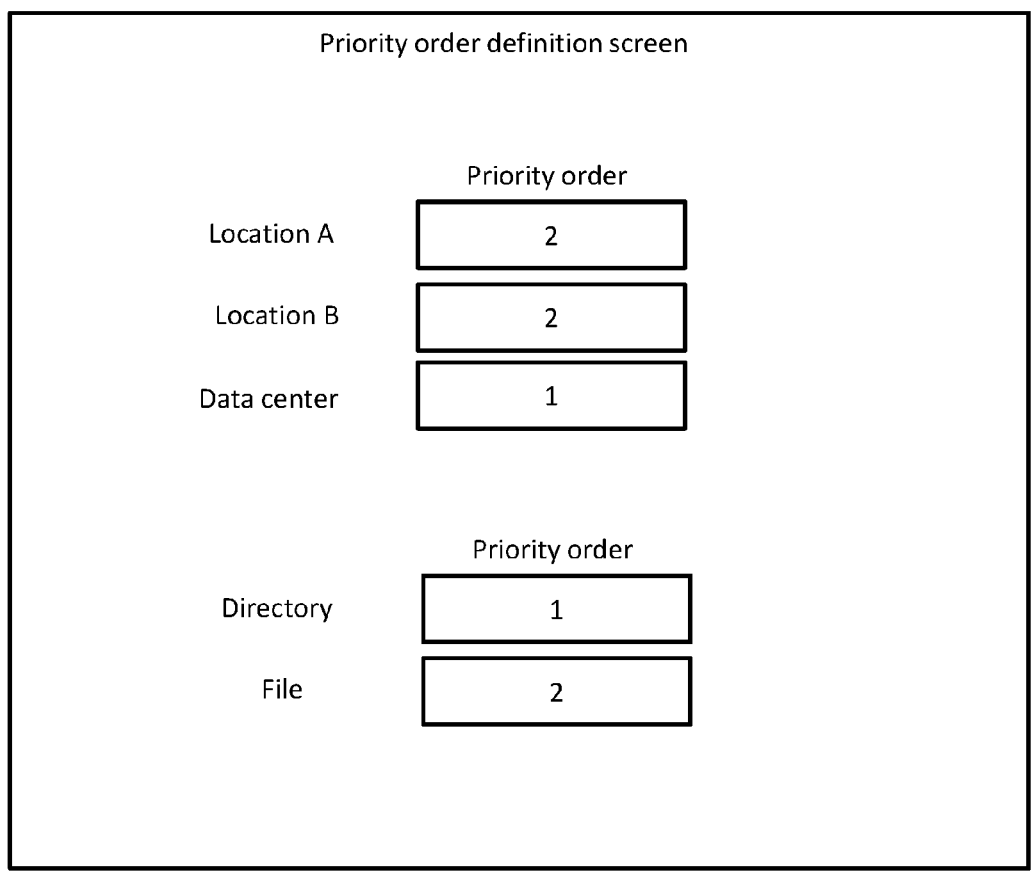
FIG. 13 shows an example of a second UI.

FIG. 13 shows an example of a second UI.

The second UI is a UI for accepting the inputs of priority orders of two or more of the multiple locations (NAS) and the data center (CAS) (the second UI may accept the priority orders of the directory and the file as shown in the diagram). The target node (policy update program) may update at least one of defined multiple conflict cases, and multiple confliction resolution policies associated with the respective defined conflict cases, for example, automatically, according to each of the input priority orders of two or more nodes (and according to the priority orders of the directories and files). For example, in a case where the priority orders of the NAS 102 in the own location and the NAS 102 in another location are inverted, the target node (policy update program) may automatically change [other location] exemplified in FIG. 4 into "own location", and [own location] exemplified in FIG. 4 into "other location". Such automatic update can reduce the burden on the user or manager.

As described above, the confliction resolution policies are associated with the respective defined conflict cases, and at least the confliction resolution policy is updatable, thereby allowing more excellent usability and flexibility to be provided for the computer system where the NASs 102 share the namespace. The UIs in FIGS. 12 and 13 are only examples, and FIGS. 12 and 13 are schematic diagrams. The UI for updating the policy information 400 can have a configuration in consideration of the knowledge level, operation skill and the like of the user or manager.

For example, according to increase or decrease in the number of locations 100, the priority orders of existing locations 100 are required to be reduced or increased. Alternatively, even if the number of locations 100 is not changed, the priority orders among the locations 100, or the priority orders of the locations 100 and the data center 120 can be different according to the time interval (e.g., the time interval in a predetermined period, such as a day, a month or a year). In this Embodiment, such situations can be flexibly supported. In a case where the corresponding relationship between the time interval and the priority order is configured in the target node, the target node (policy update program) may automatically update the policy information 400 on the basis of the configured information and the time point detected by a timer.

Employees are sometimes relocated among the locations 100. For example, in a case where the location A corresponds to an accounting department and the location B corresponds to an engineering department, and a specific employee is relocated between the locations, it is sometimes desirable that the priority orders of the locations A and B be inverted. In this Embodiment, such situations can be flexibly supported.

In the computer system that includes the multiple NASs 102 and the CAS 121 common to these NASs 102, definition of multiple conflict cases and multiple confliction resolution policies associated with the respective conflict cases is not general control replacement or transformation using the policy. For example, according to the general group policy, the behavior of the user is limited (e.g., prohibition of access to a specific directory, prohibition of downloading an execution file, etc.). On the other hand, the distributed object sharing using the policy information 400 according to this Embodiment performs a process for resolving a conflict suitable for each of conflict cases, the priority order of the location and the like, with respect to each of the conflict cases. This is to solve a problem specific to the computer system according to this Embodiment, and cannot be introduced only by replacement or conversion of the general control using the policy.

Figure 5:
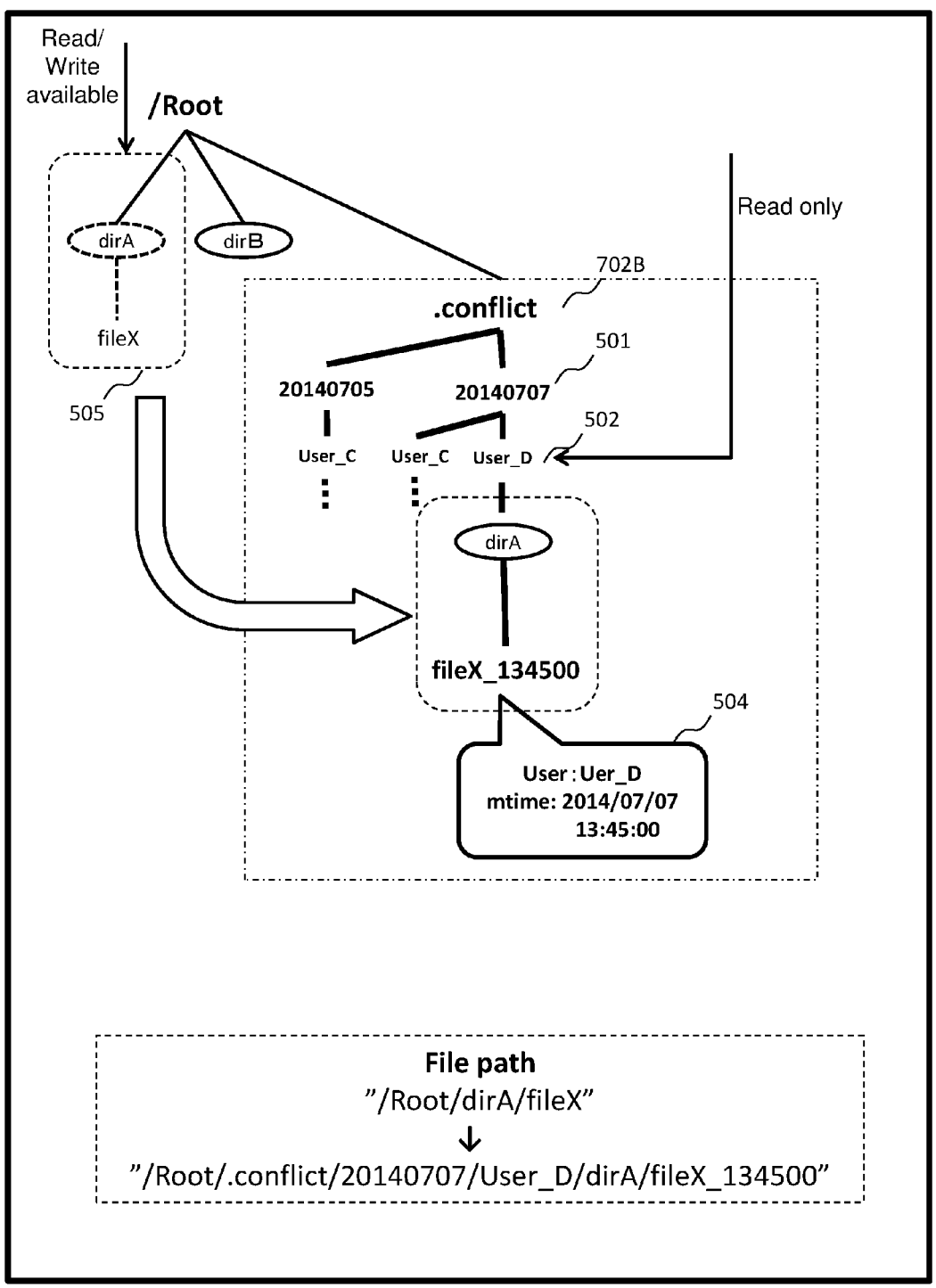
FIG. 5 shows an example of a structure of a special directory.

FIG. 5 shows an example of a structure of a special directory.

According to the NAS 102B (synchronization program 211B), the file path to the directory for evacuation created under the special directory 702B contains, as information pertaining to use of the object to be moved (evacuated), at least one of the following items:
(a) time point information indicating the latest time point when the object was created, updated or renamed; and
(b) the user ID of the user who uses the object.

In the file path, the time point information is arranged higher than the user ID. Alternatively, the user ID may be arranged higher. In the example of FIG. 5, the synchronization process moves the file path 505 (file X) to the special directory 702B. More specifically, as indicated by reference sign 504, the user ID of the user who has updated the file X at the last time is "User_D", the update time point is "2014/07/07 13:45:00" in "year/month/date hour:minute: second" representation. In this case, the synchronization program 211B creates directories for evacuation made up of directories 501B and 502B, under the special directory 702B. More specifically, the synchronization program 211B creates, as a child directory of the special directory 702B, the directory 501B that has a directory name including an upper part "20140707" in information indicating the update time point. The synchronization program 211B creates, as a child directory of the directory 501, a directory 502B that has a directory name including the user ID "User_D". The synchronization program 211B moves the file path 505 to the directory 502B. The moved file path contains the file X and all the objects on the path between the file X and the root node (or contains the file X and its parent directory). In the example of FIG. 5, the file path 505 includes the file X and its parent directory. The file path 505 is moved to the directory 502, thereby causing the highest directory on the file path 505 (the parent directory of the file X) to be one child directory of the directory 502. Furthermore, the synchronization program 211B causes the file name of the file X in the directory 502 to contain a lower part "134500" of the information indicated by the update time point.

Thus, in the special directory 702B, the objects are classified on the basis of the update time point and the user ID. Consequently, for example, evacuated file search is expected to be facilitated, and the policy of correcting and resolving the conflicting file is expected to be easily determined. In a case where a predetermined time has elapsed after the update time point identified from the file path of the file in the special directory 702B, the NAS 102B (e.g., the FS program 208B) may remove the file and the directory for evacuation (501B and 502B) from the special directory 702B.

The NAS 102B (file sharing server program 206B) limits a change operation by the client 101B for at least one object in the special directory 702B. More specifically, for example, the NAS 102B (file sharing server program 206B) associates, as access limitation, read only (reference is permitted but writing is prohibited) with a created object for evacuation. Thus, the structure in the special directory 702B can be prevented from being deformed.

Hereinafter, referring to FIGS. 6 to 11, the migration process and the synchronization process are described. At this time, the process according to the confliction resolution policy is also described.

Figure 6:
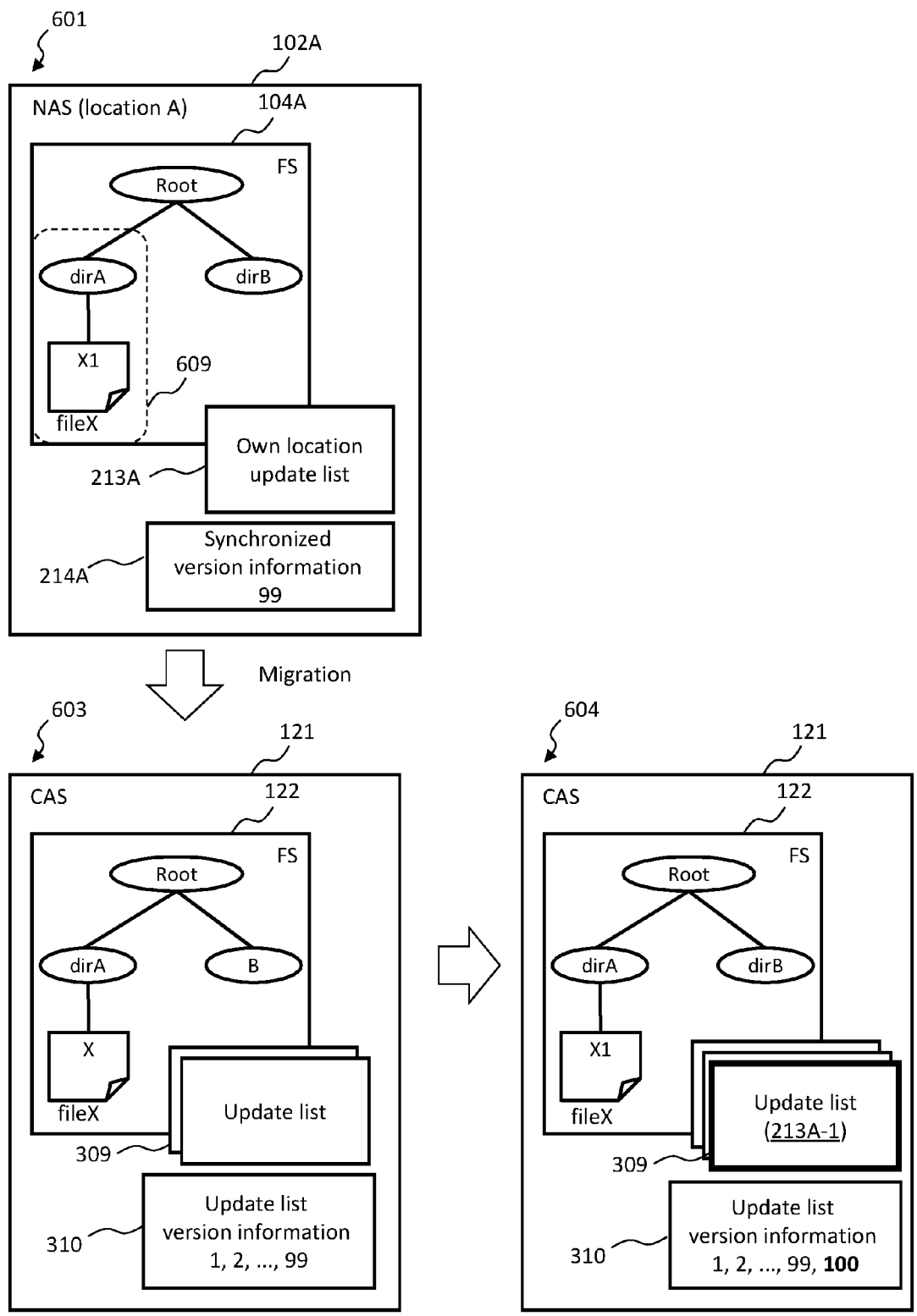
FIG. 6 shows an example of situations before and after a migration process from the NAS to the CAS at a location A.

FIG. 6 shows an example of situations before and after the migration process from the NAS 102A in the location A to the CAS 121.

The state before migration is as follows. The update list version information 310 on the CAS 121 contains version IDs "1" to "99". This means that the center FS 122 has been updated by the multiple NASs 102, total 99 times. The update list 309 corresponding to the version IDs "1" to "99" is stored in the CAS 121. In the NAS 102A, the update list 309 up to the version ID "99" has already been applied in the local FS 104A (synchronization process already applied). Thus, the version ID "99" is registered in the synchronized version information 214A. It is assumed that subsequently the file X is edited to be the file X1 by the client 101A. The own location update list 213 corresponding to the update (editing) has been created. That is, the latest state of the CAS 121 with synchronization from the CAS 121 to the NAS 102A is a state indicated by reference sign 603. Subsequently, the latest state of the NAS 102A where the file X is edited by the client 101A is a state indicated by reference sign 601. The states before migration have thus been described above.

Figure 9:
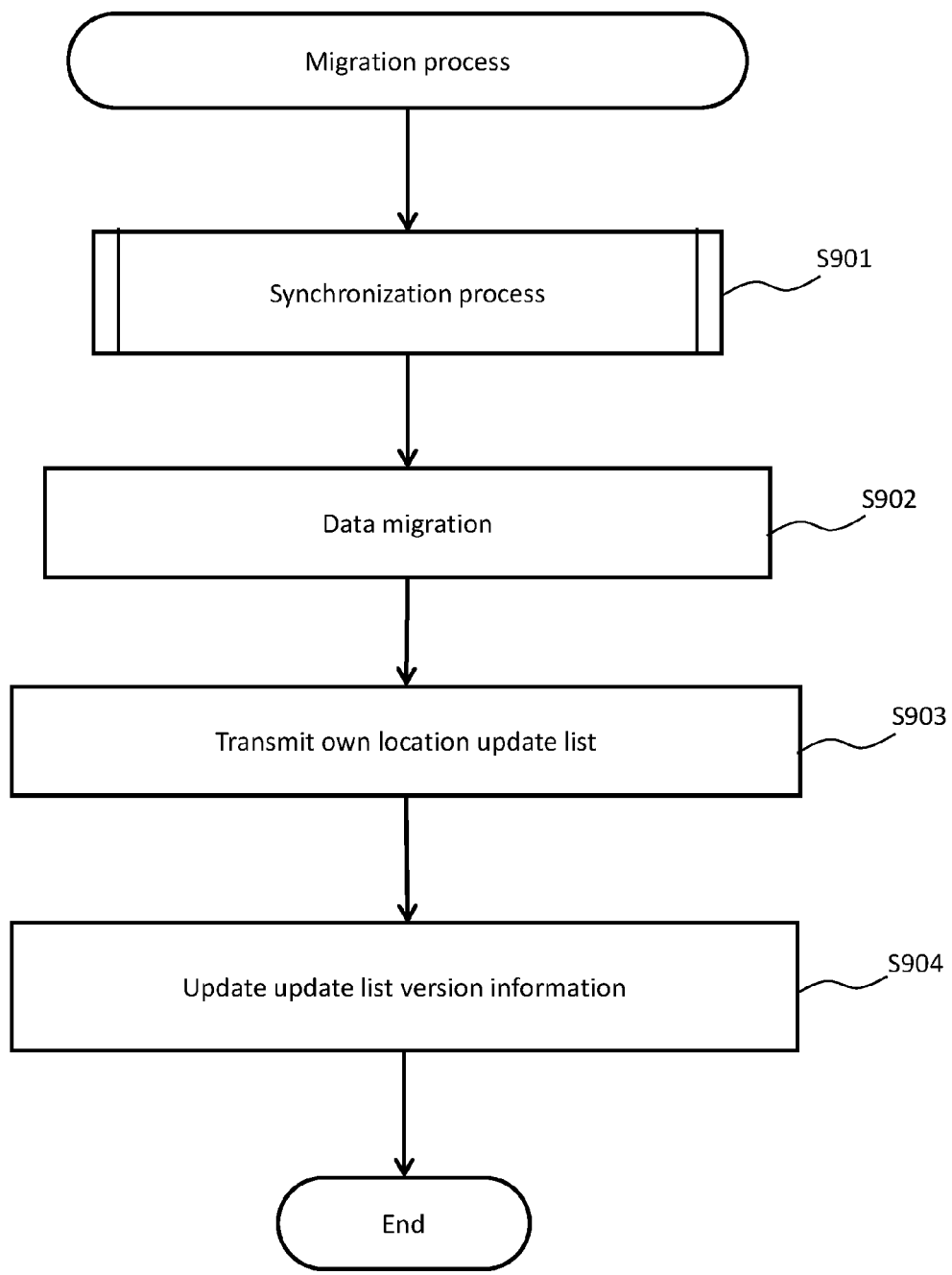
FIG. 9 is a flowchart of a migration process from the NAS to the CAS.

In the state of FIG. 6, the migration process from the NAS 102A to the CAS 121 is described using the flowchart of FIG. 9 (the state of the CAS 121 after migration is a state indicated by reference sign 604).

In S901, the migration program 212A executes the synchronization process. This is executed to apply the latest state of the CAS 121 to the own location A and to transmit only the difference to the CAS 121. However, in a case where no addition has been performed to the update list version information 310 on the CAS 121 after the latest synchronization time point, this process is not required. In the example of FIG. 6, the synchronized version information 214 on the NAS 102A (601) in the location A indicates "99", and the update list version information 310 on the CAS 121 (603) indicates "1, 2, . . . , 99". The CAS 121 has not been changed from the version "99" with which the NAS 102A (601) in the location A has been synchronized at the last time. Consequently, this process is not required.

In S902, the migration program 212A performs data migration. In this step, what has been updated from the synchronized version is applied to the CAS 121. In the application, the update is performed with the parent directory of the updated position being included. In the example of FIG. 6, the file X has been updated (the content is updated from "X" to "X1"). Consequently, the file path 609 containing the file X and its parent directory A (dirA) is applied to the center FS 122. After the application, the state becomes what is indicated by reference sign 604. That is, the content of the file X becomes "X1".

In S903, the migration program 212A transmits the own location update list 213 to the CAS 121. In the example of FIG. 6, the own location update list 213A-1 (see FIG. 8) corresponding to the update of the file X is transmitted.

In S904, the migration program 212A updates the update list version information 310. In this step, a value obtained by incrementing the latest entry value of the update list version information 310 by one is added to the end of the update list version information 310. In the example of FIG. 6, the latest entry value of the update list version information 310 is "99". Accordingly, the migration program 212A adds "100", which is obtained by adding one thereto, to the update list version information 310. Consequently, the update list version information 310 contains "1, 2, . . . , 99, 100" (reference sign 604).

The processes in S902 to S904 are continued while the own location update list 213 is present.

The migration process has thus been described above.

Subsequently, the synchronization process from the CAS 121 to the NAS 102B is described.

FIG. 7 shows an example of situations before and after a synchronization process from the CAS 121 to the NAS 102B in the location B.

First, a state before the synchronization process is described below. The CAS 121 is in the state indicated by reference sign 604. That is, it is assumed that "1" to "100" are registered in the update list version information 310, and an update list corresponding to the update list version "100" is the list 213A-1 (see FIG. 8). The synchronized version information on the NAS 102B indicates "99". Subsequently, the file X is edited by the client 101B and the content becomes "X2". According to the update, the list 213B-2 (see FIG. 8) is generated as the own location update list of the NAS 102B. The state before the synchronization process has thus been described.

Figure 10:
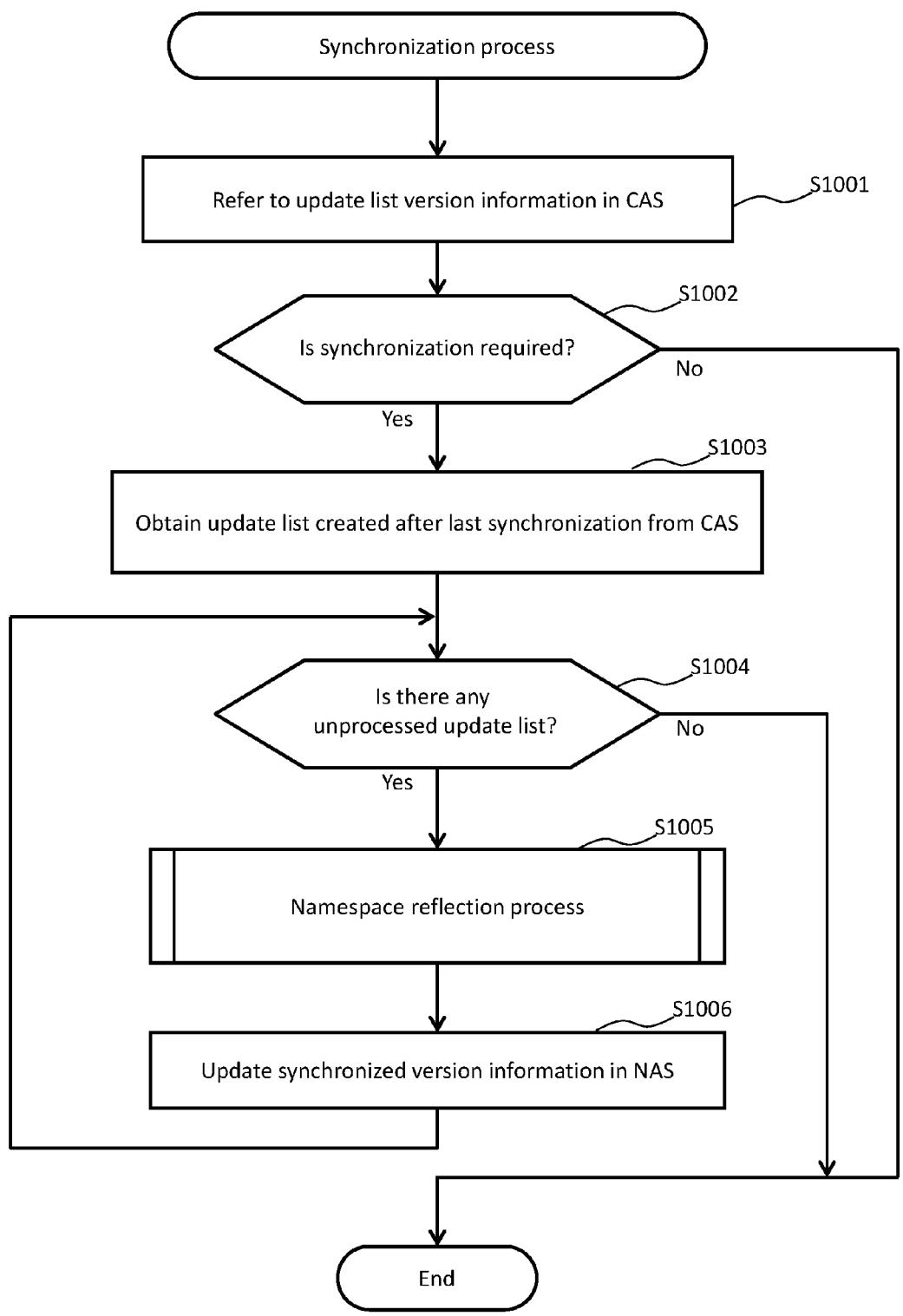
FIG. 10 is a flowchart of the synchronization process from the CAS to the NAS.

In the state of FIG. 7, the synchronization process from the CAS 121 to the NAS 102B is described using the flowchart of FIG. 10 (the state of the NAS 102B after the synchronization process is a state indicated by reference sign 701).

In S1001, the synchronization program 211B refers to the update list version information 310 on the CAS 121. In the example of FIG. 7, the update list version information 310 containing "1, 2, . . . , 100" is referred to.

In S1002, the synchronization program 211B determines whether the synchronization is required or not. In a case where the determination result is affirmative (S1002: Yes), the processing proceeds to S1003. In a case where the determination result is negative (S1002: No), the processing is finished. In this step, the synchronization program 211B determines whether or not update has been performed in the center FS 122 from the state where synchronization from the CAS 121 to the NAS 102B last time. In the case where the determination result is affirmative, S1002: Yes. In the case where the determination result is negative, S1002: No. In this Embodiment, the determination is performed using the synchronized version information 214 and the update list version information 310. In the example of FIG. 7, the synchronized version information on the NAS 102B registers "99", and "1" to "100" are registered in the update list version information 310 on the CAS 121. This means that the update version of the CAS 121 is incremented by one from that in the state where the synchronization has been performed from the CAS 121 to the NAS 102B last time. Consequently, the determination result indicates necessity of synchronization (S1002: Yes).

In S1003, the synchronization program 211B obtains the update list created after the last synchronization from the CAS 121. In the example of FIG. 7, the synchronization has already been performed up to the update list version "99". Consequently, the update list 309 (213A-1) corresponding to the update list version "100" is obtained.

In S1004, the synchronization program 211B determines whether there is any unprocessed update list 309 or not. In a case where the determination result is affirmative (S1004: Yes), the processing proceeds to S1005. In a case where the determination result is negative (S1004: No), the processing is finished. In the example of FIG. 7, there is the unprocessed update list 309 (213A-1) obtained in S1003, the processing proceeds to S1005.

Figure 11:
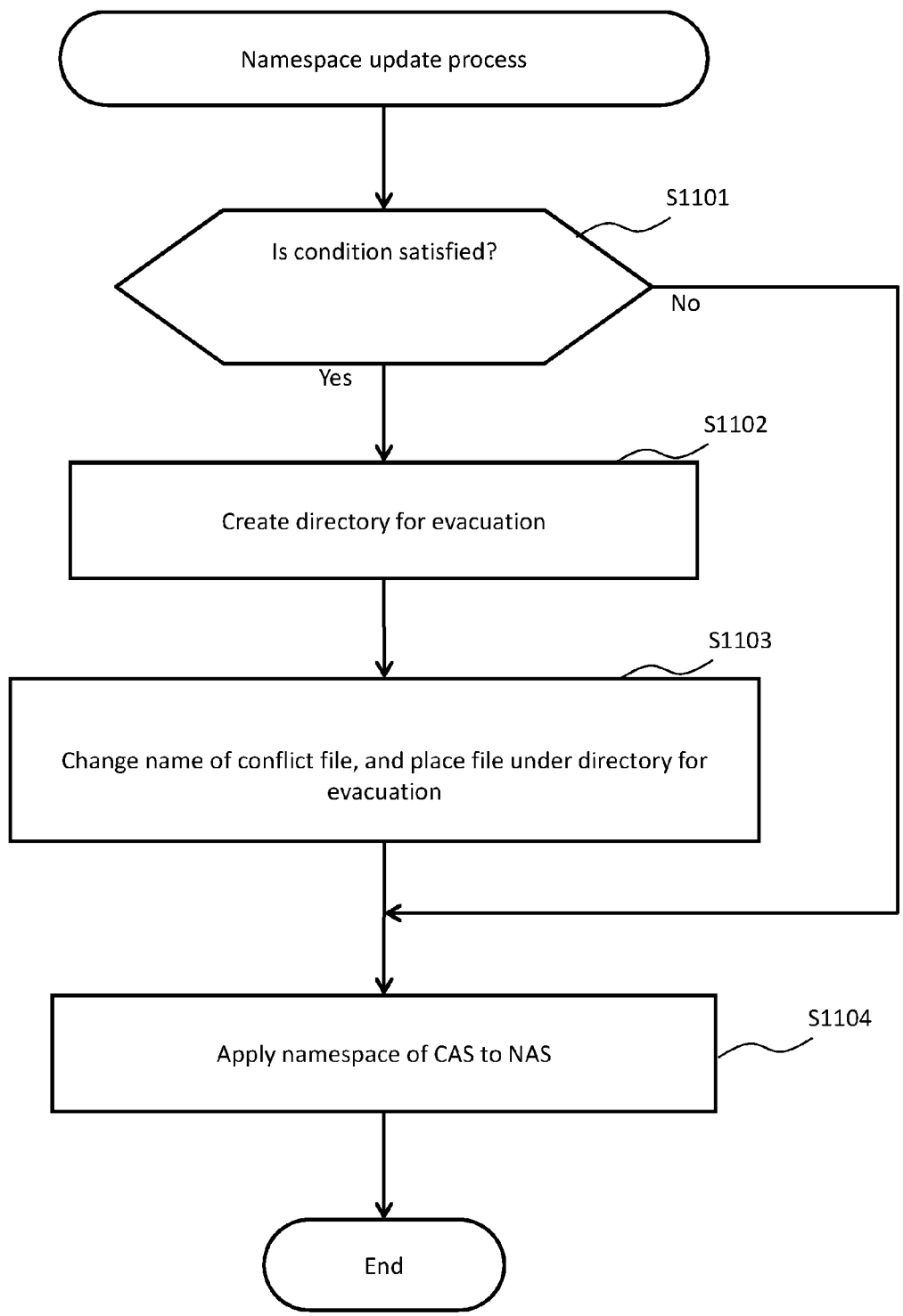
FIG. 11 is a flowchart of a namespace application process.

In S1005, the synchronization program 211B executes a namespace reflection process. In this step, the center FS 122 (the namespace of the CAS 121) is applied to the NAS 102B. This step includes one characteristic of this Embodiment. The details of this step are shown in FIG. 11. Consequently, before description of S1006, S1005 is described with reference to FIG. 11.

FIG. 11 is a flowchart of the namespace reflection process.

In S1101, the synchronization program 211B refers to the policy information 400, and determines whether or not the object (here the file X) different between the reflection source namespace and the reflection destination namespace applies to any of the conflict cases that require file evacuation. In this Embodiment, according to FIG. 4, for example, in a case of conformity to any of the following cases:

(c-1) a case where a file in the CAS 121 has been updated, and a file having the same name has been newly created or updated in the own location 100B (policy name "First-Mig-Win"); and (c-2) a case where a file having the same name as a directory created or renamed in the CAS 121 has been created in the own location B (policy name "Directory-Win"), a determination result of conformity to any of the cases that do not require file evacuation is obtained. To determine whether the case applies to any of the (c-1) and (c-2) or not, the update list 309 obtained in S1003 and the own location update list 213 may be compared with each other.

In the example of FIG. 7, according to the update content 809 in the update list 309 (213A-1) that is to be processed, it can be understood that "fileX" under "/Root/dirA" has been updated in the namespace of the CAS 121. According to the update content 809 in the own location update list 213 (213B-2) in the NAS 102B, it can be understood that "fileX" under "/Root/dirA" has been updated also in the namespace of the NAS 102B. That is, as the same file name has been updated in the CAS 121 and the NAS 102B, the case conforms to the file evacuation condition (c-1) (S1101: Yes). Consequently, the processing proceeds to S1102.

In S1102, the synchronization program 211B creates the directory for evacuation under the special directory (directory ".conflict") 702B. Although the diagram of FIG. 7 is simplified, as shown in FIG. 5 the directory 501B indicating the update date, and the directory 502B indicating the user having updated the file at the last time are provided under ".conflict" 702B. For example, as indicated by reference sign 504, in a case where the user ID of the user having updated the file at the last time is "User_D" and the last file update time point is "2014/07/07 13:45:00", a directory 501B having a name "20140707" is created under ".conflict" 702B, and a directory 502B having the name "User_D" is created thereunder. This directory tier is an example, and does not limit the invention. The directory whose name is the date is thus provided, which facilitates taking measures, such as deletion of files on and after a certain date to reduce capacity.

In S1103, the synchronization program 211B changes the name of the conflicting file and arranges the evacuation destination directory thereunder. In this step, the conflicting file is migrated under the directory created in S1102. In the example of FIG. 7, the synchronization program 211B moves the file path 703 containing the conflicting file under ".conflict" 702B as indicated by reference sign 701. More specifically, as shown in FIG. 5, the file path 703 is moved under the directory 501 having a directory name containing the date on the file path 703 and the directory 502 having a directory name containing the user ID on the file path 703. As shown in FIG. 5, the synchronization program 211B includes the lower part (hour, minute, and second) of the time point information into the file name of the migrated file ("fileX_134500").

Furthermore, the synchronization program 211B allocates "read only" as the access control attribute of the file moved to the directory for evacuation in S1103, thereby prohibiting file in the directory for evacuation from being updated by the client 101B. Thus, update of the conflicting file and change in directory tier can be avoided, and it can be expected to maintain search easiness thereafter.

In S1104, the synchronization program 211B applies the update in the center FS 122 to the local FS 104B, and finishes the processing. In the example of FIG. 7, as indicated by reference sign 701, the file path 705 containing the file X having content "X1" is added to the root node.

The description of the namespace reflection process in FIG. 11 has thus been finished. This process corresponds to S1005 of FIG. 10. Accordingly, the description returns to that of S1006 of FIG. 10.

In S1006, the synchronization program 211B updates the synchronized version information 214 on the NAS. In the example of FIG. 7, synchronization corresponding to the version "100" of the update list version information on the CAS 121 has been executed. Accordingly, "99" of the synchronized version information 214 before synchronization (reference sign 602) is updated to "100" (reference sign 701).

The processing returns to S1004, and S1005 and S1006 are repeated while any unprocessed update list 309 obtained in S1003 is present. When the unprocessed update list 309 becomes absent, the processing is finished. In the example of FIG. 7, the update list 309 obtained in S1003 is only one corresponding to the version "100", and there is no unprocessed update list 309. Consequently, the processing is finished.

The synchronization process has thus been described.

One Embodiment has thus been described. However, the present invention is not limited by this Embodiment. It is a matter of course that the present invention can be variously modified in a range without departing from the gist.

REFERENCE SIGNS LIST

101: Client, 102: NAS, 121: CAS

The invention claimed is:

1. A computer system, comprising:
a plurality of edge nodes configured to provide respective local namespaces; and
a center node coupled to the plurality of edge nodes, and configured to provide a center namespace corresponding to the plurality of local namespaces,
wherein in migration that applies an update of a first local namespace provided by a first edge node to a center namespace, or in synchronization that applies an update of the center namespace to a second local namespace provided by a second edge node, with respect to each object that is different between an reflection source namespace and an reflection destination namespace, the center node or the second edge node is configured to
(A) determine whether the object applies to any of a plurality of defined conflict cases or not, and
(B) execute a process according to a confliction resolution policy associated with the corresponding conflict case, in a case where a determination result of (A) is affirmative, and
the first edge node is any of the edge nodes, and
the second edge node is any of edge nodes other than the first edge node.

2. The computer system according to claim 1, wherein a target node that is at least one of the plurality of edge nodes, the center node, and a management node coupled to at least one of the plurality of edge nodes and the center node is configured to
provide a user interface that accepts input of information from a user or a manager, and
update or remove at least one of the plurality of defined collision cases and a plurality of confliction resolution policies corresponding to the respective defined conflict cases, or newly add a pair of a conflict case and a confliction resolution policy, according to the information input through the user interface.

3. The computer system according to claim 2, wherein the target node is configured to
receive an input of priority orders of respective two or more nodes among the plurality of edge nodes and the center node through the user interface,
update at least one of the plurality of defined conflict cases, and the plurality of confliction resolution policies corresponding to the respective conflict cases, according to the input priority orders of the two or more nodes.

4. The computer system according to claim 1, wherein each of the plurality of edge nodes is configured to store information representing the plurality of defined conflict cases, and the plurality of confliction resolution policies corresponding to the respective conflict cases, and in synchronization that applies an update of the center namespace to the local namespace provided by each of the plurality of the edge nodes, the edge node executes (A) and (B) for each of one or more changed objects among the plurality of objects in the center namespace.

5. The computer system according to claim 1, wherein in a case where the confliction resolution policy associated with the corresponding conflict case requires evacuation of a conflicting object in the second local namespace, the second edge node creates a directory for evacuation serving as an evacuation destination of the conflicting object in the second local namespace, and moves the conflicting object to the created directory for evacuation, in (B).

6. The computer system according to claim 5, wherein
the corresponding conflict case is a case where a file having a name identical to a name of a directory created or renamed in an reflection source namespace has been created in an reflection destination namespace,
the confliction resolution policy associated with the corresponding conflict case is a policy in conformity with priority being given to a directory with respect to a file, and
in (B), a process in conformity with the confliction resolution policy associated with the corresponding conflict case
stores the created or renamed directory in the second local namespace, and
moves the file having the identical file name to the directory for evacuation created in the second local namespace.

7. The computer system according to claim 5, wherein
the corresponding conflict case is a case where a file path having a name identical to a name of a file path created, updated, removed or renamed in an reflection source namespace has been created, updated, removed or renamed in an reflection destination namespace,
the confliction resolution policy associated with the corresponding conflict case is a policy in conformity with priority being given to a earlier migration, and
in (B), a process in conformity with the confliction resolution policy associated with the corresponding conflict case
applies a result of created, updated, removed or renamed in the application source namespace, to the second local namespace, and
moves a file belonging to a file path created, updated, removed or renamed in the second local namespace, to the directory for evacuation created in the second local namespace.

8. The computer system according to claim 5, wherein
the corresponding conflict case is a case where an object in a directory identical to a directory removed in the reflection source namespace has been updated in the reflection destination namespace,
the confliction resolution policy associated with the corresponding conflict case is a policy in conformity with priority being given to directory removal, and
in (B), a process in conformity with the confliction resolution policy associated with the corresponding conflict case removes the identical directory in the second local namespace without evacuation.

9. The computer system according to claim 5, wherein the second edge node is configured to prohibit a user of the second edge node from writing to the directory for evacuation.

10. The computer system according to claim 5, wherein a file path to the directory for evacuation contains, as information pertaining to use of an object to be migrated by the second edge node, at least one of:
(a) time point information indicating a latest time point when the object was created, updated or renamed; and
(b) a user ID of a user who uses the object.

11. The computer system according to claim 10, wherein
a special directory that is a higher directory of the directory for evacuation is in the second local namespace,
as to creation of the directory for evacuation, the second edge node is configured to
create, as a child directory of the special directory, a first directory that has, as a directory name, a name containing one of an upper part of the time point information and the user ID, and
create, as a child directory of the first directory, a second directory that has, as a directory name, a name containing another of the upper part of the time point information and the user ID, and
the second edge node is configured to
move the object to the second directory, and
include a lower part of the time point information into the name of the object to be moved to the second directory.

12. A distributed object sharing method performed in a computer system comprising a plurality of edge nodes configured to provide respective local namespaces, and a center node coupled to the plurality of edge nodes, and configured to provide a center namespace corresponding to the plurality of local namespaces,
in migration that applies an update of a first local namespace provided by a first edge node to a center namespace, or in synchronization that applies an update of the center namespace to a second local namespace provided by a second edge node, with respect to each object that is different between an reflection source namespace and an reflection destination namespace, the distributed object sharing method comprising: by the center node or the second edge node,
(A) determining whether the object applies to any of a plurality of defined conflict cases or not, and
(B) executing a process according to a confliction resolution policy associated with the corresponding conflict case, in a case where a determination result of (A) is affirmative, and
the first edge node being any of the edge nodes, and
the second edge node being any of edge nodes other than the first edge node.

13. An edge node, comprising:
an interface device coupled to a center node coupled to another edge node; and
a processor coupled to the interface device and configured to provide a local namespace, wherein
the center node is configured to provide a center name space,
the center namespace is updated by reflection of an update of another local namespace provided by the other edge node, and
in synchronization that reflects the update of the center namespace to the local namespace, with respect to an object different between an reflection source namespace and an reflection destination namespace, the processor is configured to
(A) determine whether the object applies to any of a plurality of defined conflict cases or not, and
(B) execute a process according to a confliction resolution policy associated with the corresponding conflict case, in a case where a determination result of (A) is affirmative.

* * * * *